United States Patent

[11] 3,541,907

| | | |
|---|---|---|
| [72] | Inventors | James G. Wiatt;<br>Edward C. Bruns, Cincinnati, Ohio |
| [21] | Appl. No. | 842,802 |
| [22] | Filed | July 3, 1969<br>Continuation of application Ser. No.<br>641,621, May 26, 1967, abandoned |
| [45] | Patented | Nov. 24, 1970 |
| [73] | Assignee | Cincinnati Milacron Inc.<br>Cincinnati, Ohio<br>a corporation of Ohio |

[54] METHOD AND APPARATUS FOR LOADING AND UNLOADING A MATERIAL CUTTING MACHINE
18 Claims, 13 Drawing Figs.

[52] U.S. Cl. .................................. 83/23,
83/155, 83/416, 83/417, 83/427, 83/428
[51] Int. Cl. .................................................. B26d 1/00
[50] Field of Search ........................................... 83/155,
417, 416, 29, 23, 271, 279, 280, 428, 427

[56] References Cited
UNITED STATES PATENTS

| Re21,353 | 2/1940 | Stone | 83/416X |
|---|---|---|---|
| 1,688,668 | 10/1928 | Sorensen | 83/155 |
| 3,238,826 | 3/1966 | Crispe | 83/155X |

Primary Examiner—James M. Meister
Attorney—Frank C. Leach, Jr.

ABSTRACT: A material cutting machine has a pair of endless bands adapted to be driven in unison to move material longitudinally relative to a cutting blade, which is disposed in a transverse passage formed between the pair of bands. The cutting blade is adapted to move transversely of the pair of bands while the material is moved longitudinally by the endless bands to cut a desired pattern in the material. A loading storage table, which has an endless band functioning as its movable top, is disposed adjacent one of the pair of bands at the end remote from the cutting blade. When a clutch is engaged, the top of the loading storage table is driven in unison with the pair of bands to advance the material from the loading storage table onto the pair of bands. A discharge storage table, which has an endless band functioning as its movable top, is disposed adjacent the other of the pair of bands at the end remote from the cutting blade. When a clutch is engaged, the top of the discharge storage table is driven in unison with the pair of bands to move a severed portion of the material, which has the pattern cut therein, from the pair of bands to the discharge storage table.

METHOD AND APPARATUS FOR LOADING AND UNLOADING A MATERIAL CUTTING MACHINE

This application is a continuation of Ser. No. 641,621, filed May 26, 1967, now abandoned.

In material cutting machines of the type shown and described in the copending patent applications of James G. Wiatt for "Machine For Cutting Material," Ser. No. 458,271, filed May 24, 1965, now U.S. Pat. No. 3,347,121, and of George W. Sederberg for "Material Cutting Machine Having Reciprocating Cutting Blade," Ser. No. 636,965, filed May 8, 1967, both assigned to the same assignee as the assignee of the present application, the material is advanced longitudinally relative to a cutting means by a pair of flexible endless bands, which are driven in unison. In the aforesaid Wiatt and Sederberg applications, the material is loaded on one of the endless bands and then driven longitudinally relative to the cutting means, which extends between the endless bands and moves transversely through a transverse passage formed therebetween, whereby the material has a desired pattern cut therein.

The loading and unloading apparatus of the present invention is particularly useful with the material cutting machines of the type shown and described in the aforesaid Wiatt and Sederberg applications since it permits increased output for a given period of time from the material cutting machine. The apparatus of the present invention automatically loads material on one of the endless bands after cutting of the material on the endless bands has been completed. Furthermore, the apparatus of the present invention utilizes a loading storage table on which the material may be stored while awaiting completion of cutting of the material already on the pair of endless bands to permit faster loading.

The apparatus of the present invention also has a discharge storage table to receive the material, which has the desired pattern cut therein. Thus, with the apparatus of the present invention, the material, which has the pattern cut therein, is readily transported from the endless bands, which are supporting the material during cutting thereof, to the discharge storage table.

An object of this invention is to provide a method and apparatus for transporting material to and from a material cutting machine.

Another object of this invention is to provide an apparatus that utilizes movable tops on storage tables, which are disposed adjacent opposite ends of the cutting table on which the material is supported during cutting thereof, to load material on and unload material from the cutting table of the material cutting machine.

Other objects of this invention will be readily perceived from the following description, claims, and drawings.

This invention relates to a material cutting machine having cutting means and a cutting table with a movable top to move the material with respect to the cutting means. At least one storage table is disposed adjacent the cutting table with the storage table having a top lying in a common plane with the top of the cutting table. The tops of the tables are selectively movable in unison to shift material from one of the table tops to the other.

This invention also relates to a method for loading and unloading a material cutting machine having a pair of endless bands to form material supporting means for material to be cut by cutting means extending into a transverse passage between the endless bands. The method comprises loading material on a loading table adjacent one of the endless bands with the material being of no greater length than the length of the portion of the endless band, which is adjacent the loading table. Then, the material is transported from the loading table to the adjacent endless band when the endless bands are moved in unison in a longitudinal direction relative to the cutting means. After the material has been transported from the loading table, the endless bands are moved in unison to move the material in a longitudinal direction relative to the cutting means. The material on the endless band then has a pattern cut therein. After cutting of the pattern is completed, the material is transported from the other of the endless bands to a discharge table.

The attached drawings illustrate a preferred embodiment of the invention, in which.

Figure 1:
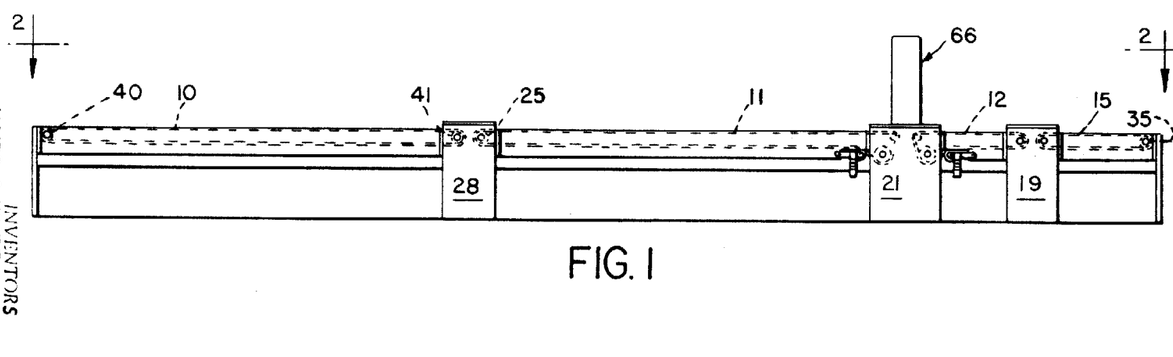
FIG. 1 is a side elevational view of a material cutting machine having the loading and unloading apparatus of the present invention associated therewith.
Figure 2:
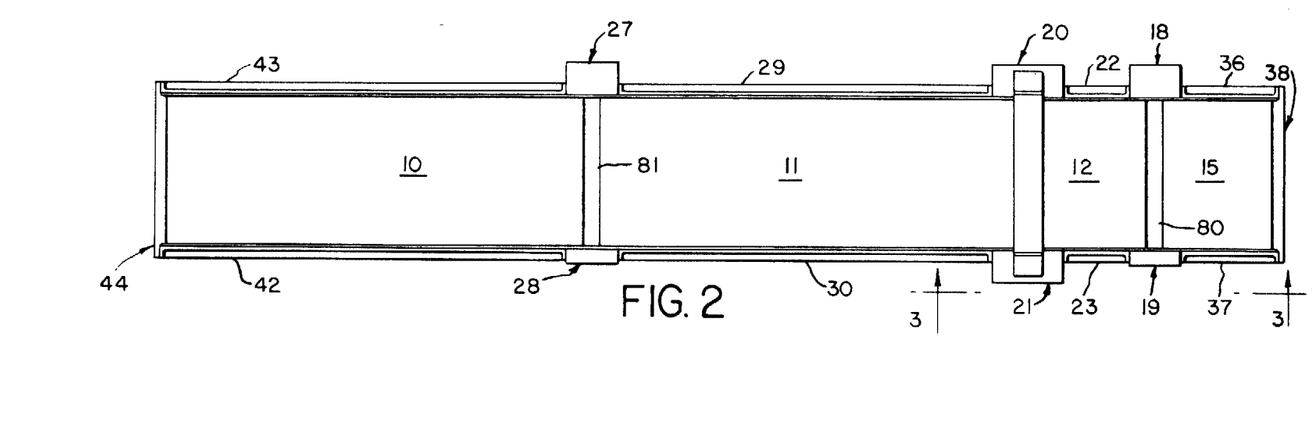
FIG. 2 is a top plan view of the structure of FIG. 1 and taken substantially along line 2–2 of FIG. 1.

Referring to the drawings and particularly FIGS. 1 and 2, there is shown an endless band 10, which has one end disposed adjacent one end of an endless band 11. The endless band 11 cooperates with an endless band 12 to form the support for material to be cut while supported thereon by suitable cutting means such as a blade 14 (see FIG. 5), which is circular in cross section and has small barbs (not shown) around its periphery to cut in any direction. One end of a fourth endless band 15 is disposed adjacent one end of the endless band 12.

As shown in FIG. 1, the endless bands 10, 11, 12, and 15, which are formed of a suitable flexible material, have their top surfaces disposed in a common plane. This permits easy movement of the material from one band to another.

Figures 3, 7:
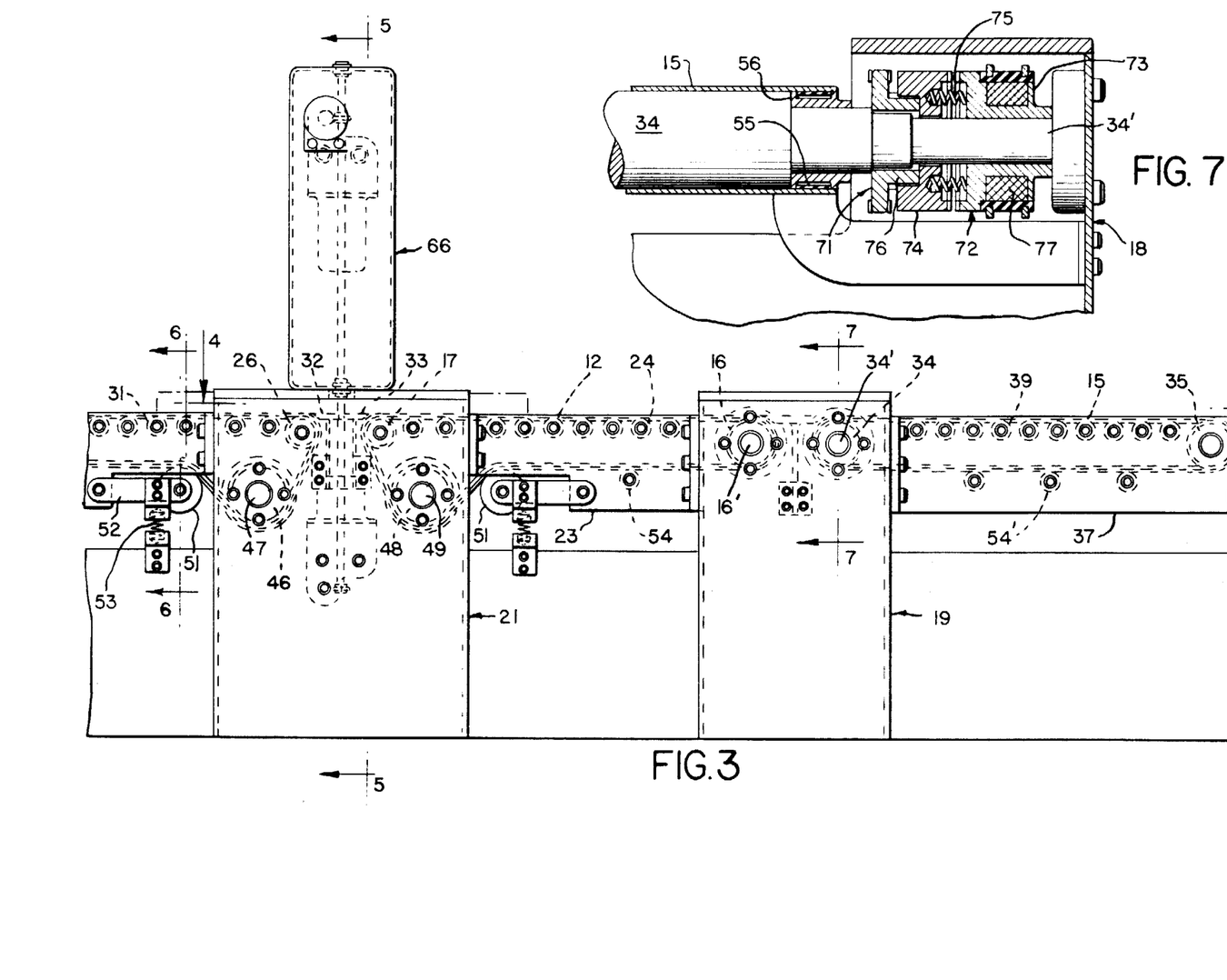
FIG. 3 is an enlarged side elevational view of a portion of the structure of FIG. 2 and taken substantially along line 3–3 of FIG. 2.
FIG. 7 is an enlarged sectional view showing the arrangement for connecting the movable top of one of the storage tables to be driven in conjunction with the mechanism for driving the endless bands on which the material is supported during cutting operations and taken substantially along line 7–7 of FIG. 3.
Figure 4:
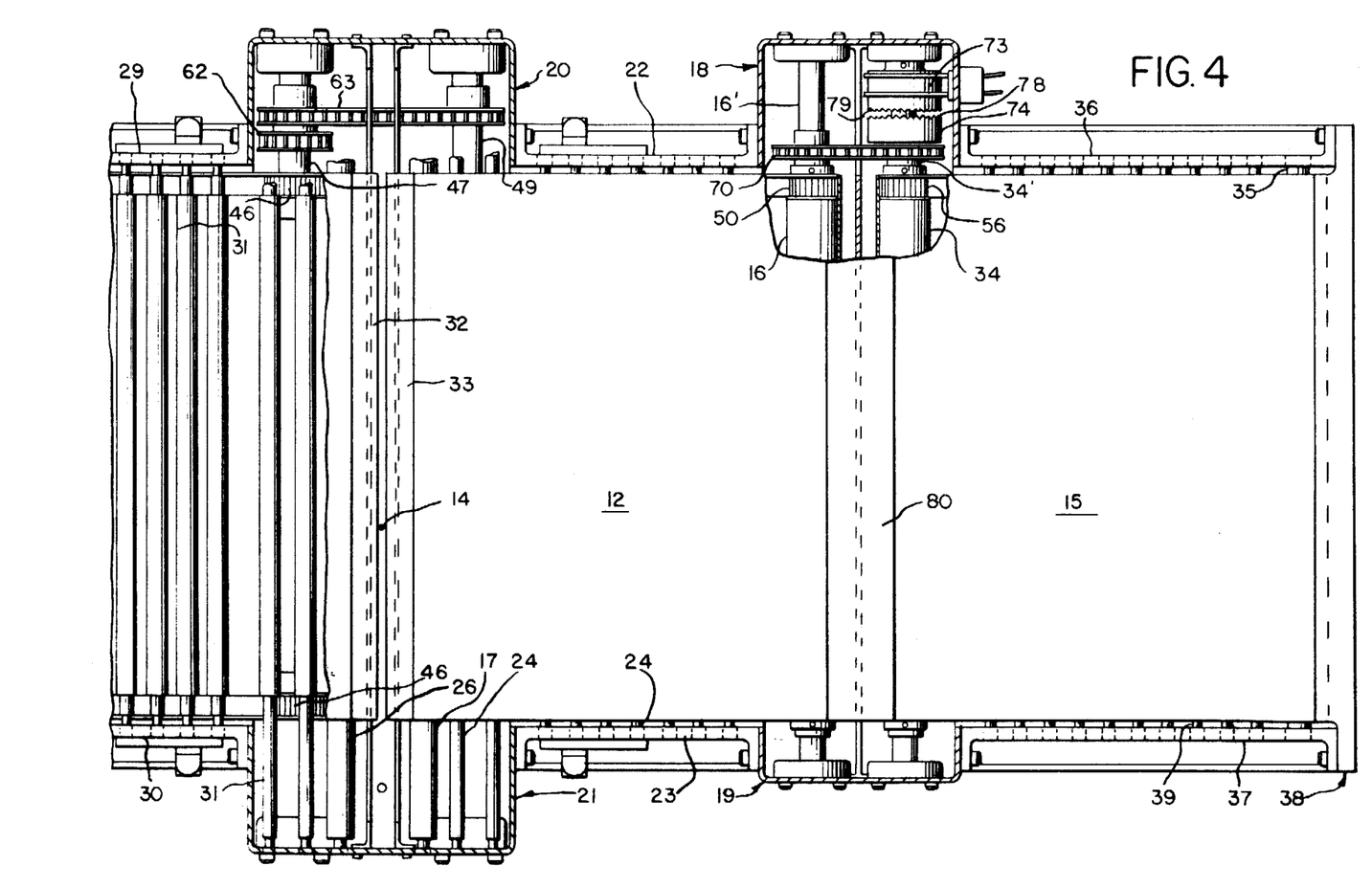
FIG. 4 is a top plan view, partly in section, of a portion of the structure of FIG. 3 and taken substantially along line 4–4 of FIG. 3.

As shown in FIGS. 3 and 4, the band 12 is received over a pair of horizontally spaced guide rollers 16 and 17. The guide roller 16 has opposite ends of its shaft 16′ rotatably journaled in intermediate support members 18 and 19. The opposite ends of the guide roller 17 are rotatably journaled in intermediate support members 20 and 21, which are horizontally spaced from the intermediate members 18 and 19, respectively.

The intermediate support members 18 and 20 are connected to each other by a side plate 22. A similar side plate 23 connects the intermediate support members 19 and 21.

A plurality of horizontally spaced support rollers 24 extends between the side plates 22 and 23. Each of the support rollers 24 is rotatably journaled in the side plates 22 and 23. As shown in FIG. 4, two of the support rollers 24 extend between the intermediate support members 20 and 21 and are rotatably journaled therein.

The support rollers 24 support the span of the band 12, at any instant, between the tops of the guide rollers 16 and 17. The span of the ban 12, at any instant, between the tops of the guide rollers 16 and 17 forms a portion of a movable top of a cutting table on which the material to be cut is supported.

The endless band 11 is received over two horizontally spaced guide rollers 25 (see FIG. 1) and 26 (see FIGS. 3 and 4). The guide roller 25 is rotatably journaled in intermediate support members 27 and 28 and extends therebetween. The guide roller 26 is rotatably journaled in the intermediate support members 20 and 21 and extends therebetween.

A side plate 29 connects the intermediate support members 27 and 20, and a similar side plate 30 connects the intermediate support members 21 and 28. A plurality of horizontally spaced support rollers 31 extends between the side plates 29 and 30 with each of the rollers 31 having its opposite ends rotatably journaled in the side plates 29 and 30. As shown in FIG. 4, two of the support rollers 31 extend between the intermediate support members 20 and 21 and are rotatably journaled therein.

Accordingly, the span of the endless band 11, at any instant, between the tops of the guide rollers 25 and 26 is supported by the support rollers 31 and forms the other portion of the movable top of the cutting table. A transverse passage, which is formed between the spaced endless bands 11 and 12, is reduced to a transverse gap by throat way sections 32 and 33, which are supported by the intermediate support members 20 and 21.

As shown in FIG. 3 and 4, the endless band 15 is received around a pair of horizontally spaced guide rollers 34 and 35. The guide roller 34 has opposite ends of its shaft 34' rotatably journaled in the intermediate support members 18 and 19. The roller 35 has its opposite ends rotatably supported in side plates 36 and 37.

The side plate 36 connects the intermediate support member 18 and an end support member 38. The side plate 37 connects the intermediate support member 19 and the end support member 38.

A plurality of horizontally spaced support rollers 39 extends between the side plates 36 and 37 with each having its opposite ends rotatably journaled in the side plates 36 and 37. The rollers 39 support the span of the endless band 15, at any instant, between the tops of the guide rollers 34 and 35. The portion of the endless band 15 between the tops of the rollers 34 and 35 functions as a movable top for a discharge storage table to which the material is transported from the endless bands 11 and 12 after the desired pattern has been cut therein.

The endless band 10 is received over guide rollers 40 and 41 (see FIG. 1). The guide roller 41 extends between the intermediate support members 27 and 28 and has its shaft rotatably journaled therein in the same manner as the roller 34 for the endless band 15 has its shaft 34' rotatably journaled in the intermediate support members 18 and 19.

The guide roller 40 extends between side plates 42 and 43 and is rotatably journaled therein in the same manner as the guide roller 35 is rotatably journaled in the side plates 36 and 37. The side plate 42 connects the intermediate support member 28 and an end support member 44. The side plate 43 connects the intermediate support member 27 and the end support member 44.

A plurality of horizontally spaced support rollers (not shown) is disposed between the guide rollers 40 and 41 to provide support to the span of the flexible band 10, at any instant, between the tops of the guide rollers 40 and 41. The support rollers are rotatably journaled in the side plates 42 and 43 in the same manner as the support rollers 39 are rotatably journaled in the side plates 36 and 37. The span of the endless band 10 between the tops of the guide rollers 40 and 41, at any instant, serves as a movable top for a loading storage table on which material may be stored before it is transported to the endless bands 11 and 12 of the cutting table.

Figure 5:
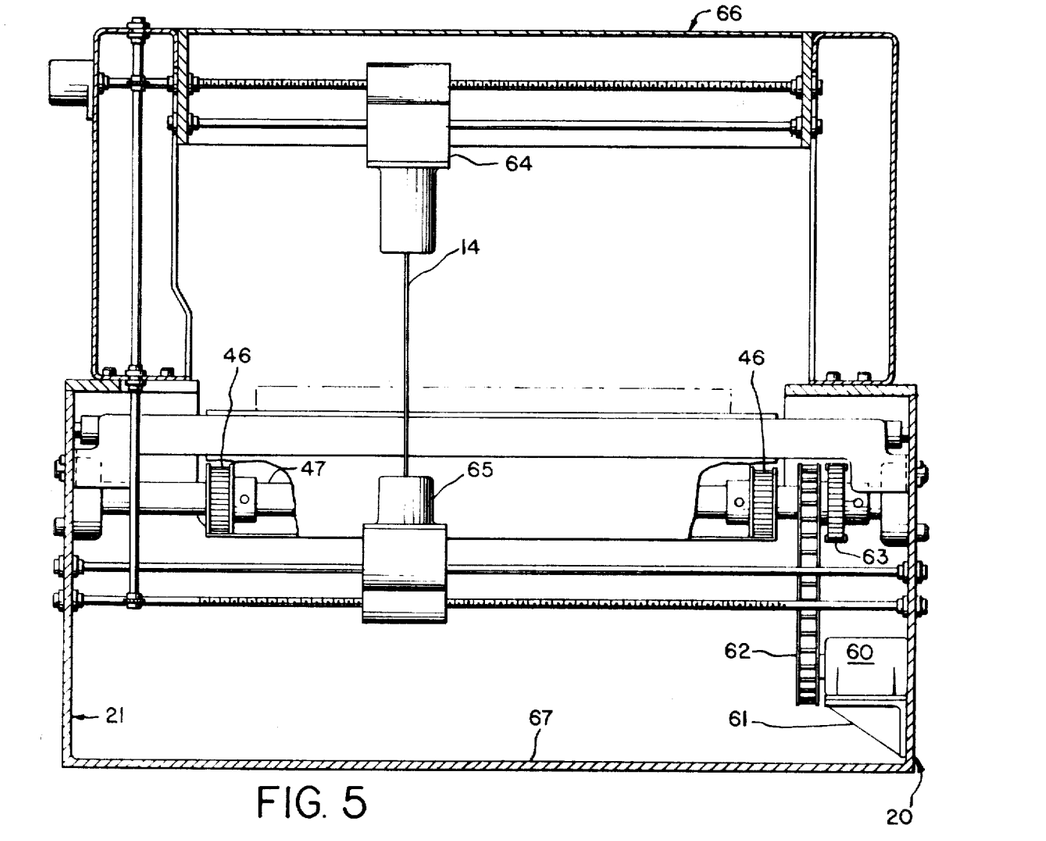
FIG. 5 is a sectional view showing portions of the longitudinal and transverse moving mechanisms and taken substantially along line 5–5 of FIG. 3.
Figure 6:
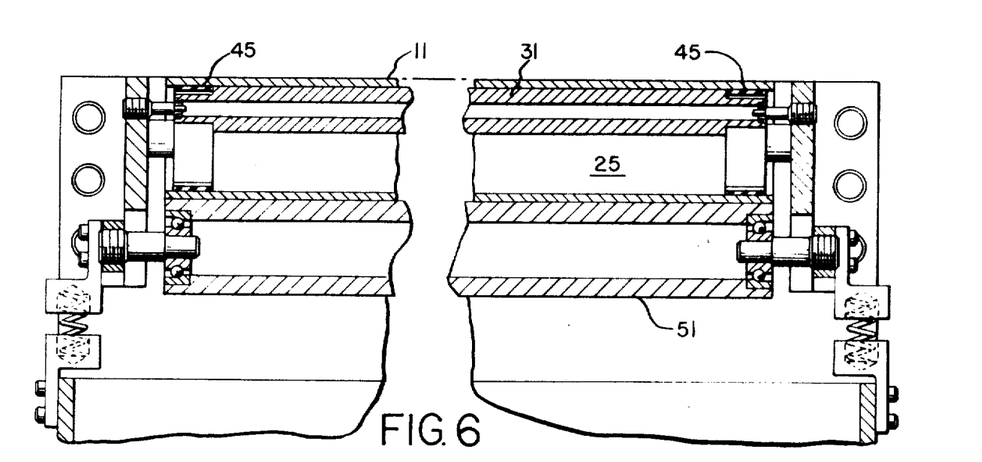
FIG. 6 is a sectional view showing details of one of the endless bands on which the material is supported during cutting operations with one of the rollers that cooperates therewith and taken substantially along line 6–6 of FIG. 3.

As shown in FIG. 6, the endless band 11 has a flexible endless belt 45 along each inner edge thereof. Each of the belts 45 has teeth thereon to engage with teeth on one of a pair of drive pulleys 46. As shown in FIGS. 3 and 5, the drive pulleys 46 are mounted on a drive shaft 47, which has its opposite ends rotatably journaled in the intermediate support members 20 and 21. Thus, any rotation of the drive shaft 47 causes the endless band 11 to be driven.

The endless band 12 has belts (not shown) on its inner edges similar to the endless belts 45. The teeth of each of the belts on the endless band 12 engage with teeth on one of a pair of drive pulleys 48. The drive pulleys 48 are mounted on a drive shaft 49, which has its opposite ends rotatably journaled in the intermediate support members 20 and 21. Thus, any rotation of the drive shaft 49 results in the endless band 12 being driven.

Pulleys 50 (one shown in FIG. 4), which have teeth engaging the teeth on the belts attached to the endless band 12, are mounted on the shaft 16' of the guide roller 16. Similar pulleys are mounted on the shaft of the guide roller 25 for cooperation with the belts 45 on the endless band 11.

As shown in FIG. 3, an idler roller 51 is mounted on arms 52, which are pivotally mounted on the side plates 29 and 30, for engagement with the endless band 11. Springs 53 bias the pivotal arms 52 to maintain the band 11 taut. The endless band 12 has a similar arrangement.

The span of the endless band 12 between the idler roller 51 and the bottom of the guide roller 16, at any instant, is supported by a support roller 54, which extends between the side plates 22 and 23 and has its ends rotatably journaled therein. A plurality of similar support rollers (not shown) is rotatably journaled in the side plates 29 and 30 and extends therebetween to provide support to the span of the band 11, at any instant, between the bottom of the guide roller 25 and the idler roller 51.

A plurality of support rollers 54' supports the span of the endless band 15, at any instant, between the bottoms of the guide rollers 34 and 35. Similar support rollers (not shown) support the span of the endless band 10, at any instant, between the bottoms of the guide rollers 40 and 41.

The endless band 15 has toothed belts 55 (one shown in FIG. 7), which are similar to the toothed belts 45, secured along its inner edges with the teeth cooperating with teeth of pulleys 56 (one shown in FIGS. 4 and 7), which are mounted on the shaft 34' of the guide roller 34. Thus, rotation of the pulleys 56 causes driving of the endless band 15.

The endless band 10 has toothed belts, which are similar to the toothed belts 55, secured along its inner edges for cooperation with teeth on pulleys (not shown), which are mounted on the shaft for the guide roller 41. This mounting arrangement is the same as for the pulley 56 mounted on the shaft 34' of the guide roller 34. Accordingly, driving of the endless band 10 occurs when the pulleys on the shaft of the guide roller 41 are rotated.

It should be understood that the teeth of the belts 55 cooperate with the teeth of pulleys (not shown) on the guide roller 35. A similar arrangement is provided for the guide roller 40.

A reversible motor 60 (see FIG. 5) is mounted on a bracket 61 of the intermediate support member 20. The motor 60 is connected to the drive shaft 47 through a chain 62, which meshes with a sprocket on the shaft 47 and a sprocket on a shaft of the motor 60, to rotate the drive shaft 47 in either direction. As shown in FIG. 4, a chain 63 extends from a sprocket on the drive shaft 47 to a sprocket on the drive shaft 49 whereby the drive shafts 47 and 49 are rotated in unison in either direction by the motor 60.

As shown in FIG. 5, the cutting blade 14 is supported in slides 64 and 65, which are adapted to be moved transversely with respect to the endless bands 11 and 12 as more particularly shown and described in the aforesaid Wiatt application, and reciprocated by mechanism (not shown) in the slides 64 and 65. The upper slide 64 is supported within a bridge 66, which extends between the intermediate support members 20 and 21.

As shown in FIG. 5, the intermediate support members 20 and 21 have a common base 67. It should be understood that the intermediate support members 18 and 19 and the intermediate support members 27 and 28 may have similar common bases.

As shown in FIG. 4, a chain 70 extends from a sprocket, which is fixed to the shaft 16', to a sprocket 71 (see FIG. 7), which is rotatably mounted on the shaft 34'. When a clutch 72 is engaged, the sprocket 71 is connected to the shaft 34' whereby the shaft 34' is rotated in unison with the drive shafts 47 and 49. One suitable example of the clutch 72 is Bendix Model "EZE" Toothed Clutch.

The clutch 72 includes a portion 73, which is fixed to the shaft 34' for rotation therewith. A connecting member 74 is resiliently urged away from the portion 73 by springs 75. The connecting member 74 is spline connected to an annular portion 76 of the sprocket 71 whereby the connecting member 74 rotates with the sprocket 71 while being slidable relative thereto.

When an electromagnet 77 in the portion 73 of the clutch 72 is energized, the connecting member 74 is moved axially against the force of the springs 75 until teeth 78 (see FIG. 4) on the connecting member 74 engage with teeth 79 (see FIG. 4) on the portion 73. With the teeth 78 and 79 engaged with each other, the sprocket 71 is connected to the shaft 34' whereby the endless band 15 is driven in unison with the endless band 12. Since the endless band 12 is driven in unison with the endless band 11 through the chain 63, the endless band 15 moves in unison with the endless bands 11 and 12 whenever the clutch 72 is engaged.

A structure (not shown), which is the same as the structure connecting the endless bands 12 and 15, is employed to connect the endless bands 10 and 11 to each other. Thus, when a clutch (not shown) is engaged, the endless band 10 is driven in unison with the endless bands 11 and 12.

As shown in FIG. 4, the gap between the endless bands 12 and 15 is closed by a transverse member 80. The member 80 is supported by the intermediate support members 18 and 19.

A similar transverse member 81 (see FIG. 2) closes the gap between the endless bands 10 and 11. The member 81 is supported by the intermediate support members 27 and 28 in the same manner as the member 80 is supported by the intermediate support members 18 and 19.

Accordingly, material on any of the endless bands 10, 11, 12, and 15 may be advanced therebetween depending on whether only the motor 60 is energized or whether the motor 60 and one or both of the clutch 72 and the clutch for connecting the endless bands 10 and 11 are energized. The motor 60 must always be energized for movement of any of the bands 10, 11, 12, and 15 to occur.

Considering the operation of the loading and unloading apparatus of the present invention, it will be assumed that there is no material on any of the endless bands 10, 11, 12, and 15. Thus, in order to load material, which may be a plurality of layers of cloth, for example, for feeding past the cutting blade 14, material 82 is initially disposed on the endless band 10. As previously mentioned, the band 10 forms the movable top of the loading storage table.

Before the clutch, which connects the endless bands 10 and 11 together to cause the endless band 10 to move in unison with the endless bands 11 and 12, is engaged, the motor 60 is driven by a numerical control apparatus (not shown) to position a desired portion of the endless band 11 relative to the endless band 10. This is necessary so that the numerical control apparatus will start cutting at the desired point on the material 82 when the material 82 is moved by the numerical control apparatus to be positioned for cutting by the cutting blade 14.

Figure 8A:
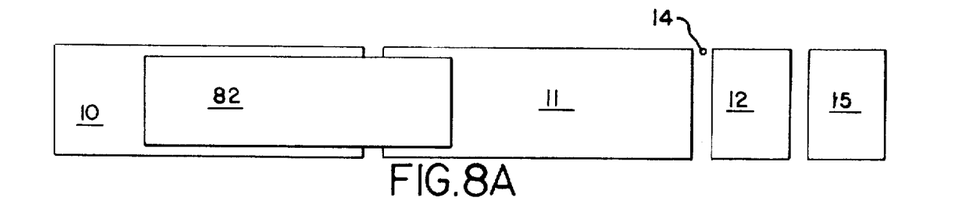
FIGS. 8A to 8F are schematic top plan views showing loading and unloading of the material with the apparatus of the present invention.

With the numerical control apparatus having energized the motor 60 to position the endless band 11 with respect to the endless band 10, the numerical control apparatus causes the clutch, which connects the endless bands 10 and 11, to be engaged. When this occurs, the material 82 is advanced from the endless band 10 to the endless band 11 as shown in FIG. 8A.

The motor 60 continues to advance the material 82 from the endless band 10 to the endless band 11 through driving the endless band 10 in unison with the endless bands 11 and 12 until the material 82 is completely removed from the endless band 10. The exact position of the material 82 with respect to the cutting blade or wire 14 will be determined by the numerical control apparatus as the position at which it is desired for initial cutting of the material 82 to occur.

Figure 8B:
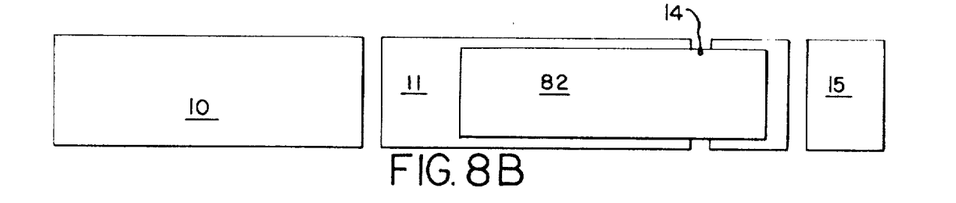

As shown in FIG. 8B, cutting of the material 82 starts when the material 82 supported on both the endless bands 11 and 12. Of course, depending upon the pattern desired, all the material 82 could be disposed on the endless band 11 at the start of the cutting operation.

With the material 82 at its initial cutting position, the motor 60 is stopped and the clutch, which connects the endless band 10 to the endless band 11, is deenergized to disconnect the band 10 from the band 11. At this time, two operations may occur.

Figure 8C:
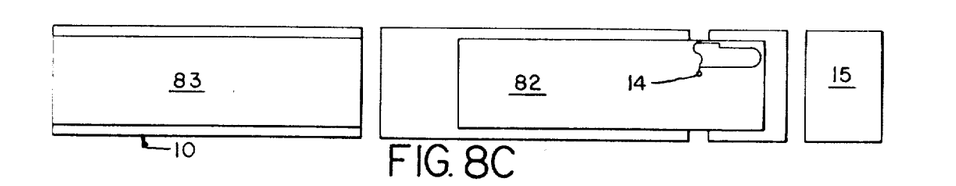

One of these is controlled by the numerical control apparatus whereby the cutting blade 14 is moved transversely of the endless bands 11 and 12 in the manner described in the aforesaid Wiatt application and the endless bands 11 and 12 are moved longitudinally in unison by the motor 60. The second operation is that material 83, which is the same as the material 82, is now disposed on the endless band 10 as shown in FIG. 8C.

The cutting operation continues until the desired pattern is formed in the material 82. When the cutting blade 14 has reached the position shown in FIG. 8D, it will have completely served a portion 84, which has the pattern cut therein, from the remainder of the material 82.

Figure 8D:
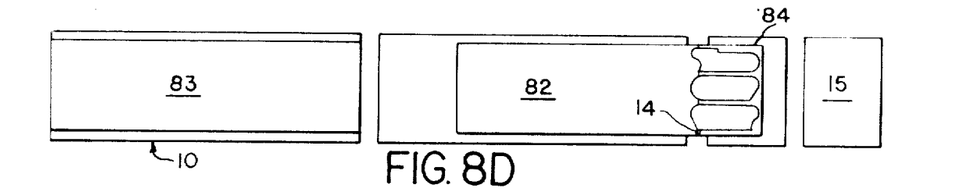
Figure 8E:
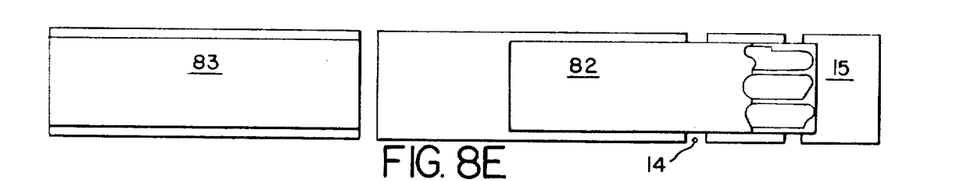

When the cutting blade 14 has reached the position of FIG. 8D, the numerical control apparatus causes energization of the clutch 72 whereby the endless band 15 is driven in unison with the endless bands 11 and 12. The direction of rotation of the motor 60 is such that the material 82 including the portion 84 will be moved to the right as viewed in FIGS. 8A to 8F.

Figure 8F:
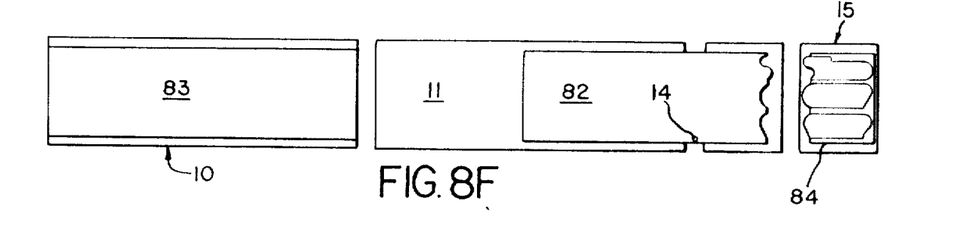

The advancement of the material 82 onto the endless band 15 continues until the portion 84 is completely on the endless band 15 as shown in FIG. 8F. After the portion 84 of the material 82 has been completely disposed on the endless band 15, the motor 60 stops. Then, the clutch 72 is disconnected. These functions are controlled by the numerical control apparatus. The material 84 is then removed from the endless band 15.

After the portion 84 of the material 82 is disposed on the endless band 15, the motor 60 is again energized and rotates in the opposite direction to return the material 82 to a position in which the next portion of the material 82 may have the pattern cut therein. Thus, the material 82 is now positioned as shown in FIG. 8F.

At this time, the control of the cutting blade 14 and the endless bands 11 and 12 by the numerical control apparatus results in the pattern again being formed in the material 82 but by the cutting blade 14 moving in the opposite transverse direction to that in which it moved from FIGS. 8B to 8D. When the cutting blade 14 has returned to the position of FIG. 8B, another portion of the material 82 will be severed from the main body of the material 82 and be ready for transportation to the endless band 15.

The endless band 15 is again connected to the endless bands 11 and 12 by the clutch 72 for driving in unison therewith. The remainder of the steps of operation are the same as previously described.

After the final portion of the material 82 has had the desired pattern cut therein and been moved to the endless band 15, the motor 60 is stopped and the clutch 72 is disconnected. Then, the motor 60 drives the endless bands 11 and 12 in the opposite direction to that when advancing the material from the endless bands 11 and 12 to the endless band 15.

This movement of the endless bands 11 and 12 continues until the endless band 11 is properly positioned by the numerical control apparatus to receive the material 83 on the endless band 10 so that the initial edge of the material 83 will be positioned at the desired point relative to the cutting blade 14 for initial cutting operation to begin when the material 83 is supported only on the bands 11 and 12.

The motor 60 is then stopped and the clutch, which connects the endless bands 10 and 11, is energized. As a result, driving of the motor 60 now causes the material 83 to be advanced from the endless band 10 to the endless band 11 in the same manner as previously described for moving the material 82 from the endless band 10 to the endless band 11. The remainder of the operation is the same as previously described for the material 82.

The endless band 12 is shown relatively short in length in comparison with the endless band 11. This is because relatively short portions (approximately 4 feet in length) of the material 82 are cut. However, the specific length of the endless band 12 would be determined by the maximum length of the portion of the material to be cut. Thus, the band 12 would have the same length as the band 11 if only one pattern were to be cut in the entire length of the material. The endless band 15 will have at least the same length as the endless band 12 in order to completely support the material that has been cut.

It should be understood that the cutting table, which is elongated, would comprise the structure between the intermediate support members 18, 19 and 27, 28 with the end of the band 11 adjacent the band 10 defining one end of the cutting table and the end of the band 12 adjacent the band 15 defining the other end of the cutting table. The loading storage table, which is elongated, would include the structure between the end support member 44 and the intermediate support members 27, 28 with the ends of the band 10 defining the ends of the loading storage table. The discharge storage table would comprise the structure between the end support member 38 and the intermediate support members 18, 19 with the ends of the band 15 defining the ends of the discharge storage table.

While this invention has been described in connection with the cutting blade 14 being a wire of the type shown and described in the aforesaid Wiatt application, it should be understood that the cutting blade 14 could be either the reciprocating cutting knife of the aforesaid Sederberg application or any other suitable type of cutting blade. One other suitable type of cutting blade is the endless band, which is shown and described in the copending patent application of James G. Wiatt and Edward C. Burns for "Machine For Cutting Material," Ser. No. 455,269, filed May 12, 1965, now U.S. Pat. No. 3,350,969, and assigned to the same assignee as the assignee of the present application.

The driving mechanisms for the endless bands 10, 11, 12, and 15 could be of the type shown in the aforesaid Sederberg application. An adjustable takeup roller would have to be employed with each of the bands to obtain the desired tightness.

Although the present invention has been described as having its sequence of operations controlled by a numerical control apparatus, it should be understood that the various movements of the endless bands 10, 11, 12, and 15 in conjunction with each other could be controlled through suitable manual controls if desired. Of course, the cutting operations would still be controlled by a numerical control apparatus. However, this would decrease the ability of the operator of the material cutting machine to perform the various functions as quickly.

An advantage of this invention is that it permits faster operation of a material cutting machine. Another advantage of this invention is that it reduces the down time between cutting cycles of a material cutting machine.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

We claim:

1. In a material cutting machine having cutting means and a cutting table with a movable top disposed on both sides of said cutting means to move the material with respect to the cutting means, the combination including:
   at least one storage table adjacent said cutting table;
   said storage table having a top lying in a common plane with the top of the cutting table; and
   means to selectively move the tops of said tables in unison to shift material from said top of one of said tables to said top of the other of said tables.

2. The combination according to claim 1 including:
   first means to drive the top of said cutting table;
   second means to drive the top of said storage table; and
   means to selectively couple said first and second drive means to move the top of said storage table in unison with the top of said cutting table.

3. The combination according to claim 1 in which said cutting table has two flexible endless bands in end to end relationship with the tops of said bands lying in a common plane and defining the top of said cutting table.

4. The combination according to claim 1 in which:
   said cutting table is elongated and has one end adjacent one end of said storage table;
   the tops of said cutting table and said storage table are flexible;
   the top of said cutting table extends up to said one end of said cutting table; and
   the top of said storage table extends up to said one end of said cutting table.

5. The combination according to claim 1 including:
   a loading storage table adjacent one end of said cutting table and a discharge storage table adjacent the other end of said cutting table;
   each of said storage tables having a top lying in a common plane with the top of said cutting table;
   means selectively to move the top of said loading storage table with the top of said cutting table for movement therewith to carry material from said loading table to said cutting table; and
   means selectively to move the top of said discharge storage table with the top of said cutting table for movement therewith to carry material from said cutting table to said discharge storage table.

6. The combination according to claim 5 in which:
   said cutting table is elongated and has one end adjacent one end of said loading storage table and its other end adjacent one end of said discharge storage table;
   the tops of said cutting table, said loading storage table, and said discharge storage table are flexible;
   the top of said cutting table extends to each of said ends of said cutting table;
   the top of said loading storage table extends to said one end of said loading storage table; and
   the top of said discharge storage table extends to said one end of said discharge storage table.

7. In a material cutting machine having cutting means and a cutting table with a movable top to move the material with respect to the cutting means, the combination including:
   a loading storage table adjacent one end of the cutting table and a discharge storage table adjacent the other end of the cutting table;
   each of said storage tables having a top lying in a common plane with the top of said cutting table; and
   means selectively to move the top of said loading storage table to load material therefrom onto said cutting table and selectively to move the top of said discharge storage table to load material thereon from said cutting table.

8. The combination according to claim 7 in which:
   said cutting table is elongated and has one end adjacent one end of said loading storage table and its other end adjacent one end of said discharge storage table;
   the tops of said cutting table, said loading storage table, and said discharge storage table are flexible;
   the top of said cutting table extends to each of said ends of said cutting table;
   the top of said loading storage table extends to said one end of said loading storage table;
   the top of said discharge storage table extends to said one end of said discharge storage table; and
   said selectively moving means moves the tops of said cutting table and said loading storage table in unison to load material from said loading storage table to said cutting table and moves the tops of said cutting table and said discharge storage table in unison to load material from said cutting table to said discharge storage table.

9. In a material cutting machine having cutting means and a storage table with a movable top to move the material with respect to the cutting means, the combination including:
   a loading storage table and a discharge storage table with each having a movable top lying in a common plane with the top of the cutting table;

said loading storage table having an end adjacent an end of said cutting table when material is to be transported from said loading storage table to said cutting table;

said discharge storage table having an end adjacent an end of said cutting table when material is to be transported from said cutting table to said discharge storage table; and means selectively to move the top of the loading storage table to load material therefrom onto the cutting table and selectively to move the top of the discharge storage table to load material thereon from the cutting table.

10. The combination according to claim 9 in which:

said selectively moving means includes:

first means selectively to move the top of said loading storage table and the top of said cutting table together to transport material from said loading storage table to said cutting table; and second means selectively to move the top of said discharge storage table and the top of said cutting table together to transport material from said cutting table to said discharge storage table.

11. The combination according to claim 9 in which said cutting table has two flexible endless bands in end to end relationship with the tops of said bands lying in a common plane to define the top of said cutting table.

12. In a material cutting machine, the combination comprising:

a cutting table having two flexible endless bands in end to end relationship;

the tops of said bands lying in a common plane to define a table top;

a loading storage table having one end adjacent one end of said cutting table;

a discharge storage table having one end adjacent the other end of said cutting table;

each of said storage tables having a movable top;

first means selectively to move the top of said loading storage table and at least one of said flexible bands together to transport material from said loading storage table to said cutting table; and second means selectively to move the top of said discharge storage table and at least the other of said flexible bands together to transport material from said cutting table to said discharge storage table.

13. The combination according to claim 12 in which:

cutting means is disposed between said two flexible endless bands;

said two flexible endless bands define a movable table top with two portions lying in a common plane;

one of said bands extends to said one end of said cutting table and the other of said bands extends to said other end of said cutting table;

the top of each of said storage tables being flexible and lying in the common plane of said bands;

the top of said loading storage table extends to said one end of said loading storage table;

the top of said discharge storage table extends to said one end of said discharge storage table;

means to couple the two portions of the top of said cutting table together for movement in unison to move the material with respect to said cutting means;

first means to drive the top of said loading storage table;

second means to drive the top of said discharge storage table;

said first selective moving means coupling said first drive means and said coupling means to move the top of said loading storage table with the top of said cutting table to carry material from said loading storage table to said cutting table; and said second selective moving means coupling said second drive means and said coupling means to move the top of said discharge storage table with the top of said cutting table to carry material from said cutting table to said discharge storage table.

14. A method for loading and unloading a material cutting machine having a movable top forming material supporting means for material to be cut by cutting means, said method comprising:

disposing a movable top of a loading table having material thereon adjacent the movable top forming the material supporting means;

moving the movable top of the loading table to transport the material from the loading table to the movable top forming the material supporting means;

moving the movable top forming the material supporting means relative to the cutting means after the material has been transported from the loading table to position the material relative to the cutting means;

cutting a pattern in the material supported on the movable top forming the material supporting means;

disposing a movable top of a discharge table adjacent the movable top forming the material supporting means; and moving the movable top of the discharge table in unison with the movable top forming the material supporting means to transport the material after cutting of the pattern is completed from the movable top forming the material supporting means to the movable top of the discharge table.

15. The method according to claim 14 in which:

the portion of the material having the pattern cut therein is severed from the remainder of the material; and the severed portion is transported from the movable top forming the material supporting means to the movable top of the discharge table.

16. A method for loading and unloading a material cutting machine having a pair of endless bands to form material supporting means for material to be cut by cutting means extending into a transverse passage between the endless bands, said method comprising:

loading material on a loading table adjacent one of the endless bands with the material being of no greater length than the length of the portion of the one endless band on which the material is to be supported;

transporting the material from the loading table to the one endless band when the endless bands are moved in unison in a longitudinal direction relative to the cutting means;

moving the endless bands in unison to move the material in a longitudinal direction relative to the cutting means after the material has been transported from the loading table;

cutting a pattern in the material supported on the endless bands; and transporting the material after cutting of the pattern is completed from the other of the endless bands to a discharge table.

17. The method according to claim 16 comprising:

cutting a pattern in a portion of the material remote from the loading table;

severing the portion of the material having the pattern cut therein from the remainder of the material; and transporting the severed portion from the other of the endless bands to the discharge table.

18. A method for loading and unloading a material cutting machine having a pair of endless bands to form material supporting means for material to be cut by cutting means extending into a transverse passage between the endless bands, said method comprising:

loading material on a movable top of a loading table;

moving the top of the loading table in unison with at least the adjacent of the endless bands to transport the material on the top of the loading table to the adjacent endless band;

moving the endless bands in unison to move the material thereon in a longitudinal direction relative to the cutting means after the material has been transported from the loading table;

cutting a pattern in the portion of the material remote from the loading table;

severing the portion of the material having the pattern cut therein from the remainder of the material; and moving a movable top of a discharge table in unison with at least the other of the endless bands to transport the severed portion of the material from the other endless band to the discharge table.